US010824461B2

(12) United States Patent
Sabev et al.

(10) Patent No.: US 10,824,461 B2
(45) Date of Patent: Nov. 3, 2020

(54) DISTRIBUTED PERSISTENT VIRTUAL MACHINE POOLING SERVICE

(71) Applicant: SAP SE, Walldorf (DE)

(72) Inventors: Hristo Sabev, Sofia (BG); Iliyan Mihaylov, Sofia (BG); Rashid Rashidov, Sofia (BG)

(73) Assignee: SAP SE, Walldorf (DE)

( * ) Notice: Subject to any disclaimer, the term of this patent is extended or adjusted under 35 U.S.C. 154(b) by 58 days.

(21) Appl. No.: 16/216,336

(22) Filed: Dec. 11, 2018

(65) Prior Publication Data

US 2020/0183723 A1    Jun. 11, 2020

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC ......... G06F 9/45558; G06F 2009/4557; G06F 2009/45583
See application file for complete search history.

(56) References Cited

U.S. PATENT DOCUMENTS

| 7,512,953 | B1 | 3/2009 | Sabev |
| 7,690,001 | B2 | 3/2010 | Sabev |
| 8,046,731 | B2 | 10/2011 | Sabev et al. |
| 8,060,858 | B2 | 11/2011 | Mitrov et al. |
| 8,171,486 | B2 | 5/2012 | Sabev |
| 2011/0131448 | A1* | 6/2011 | Vasil ...................... G06F 9/5038 714/19 |
| 2014/0196029 | A1* | 7/2014 | Kannan ............... G06F 9/45504 718/1 |
| 2014/0317617 | A1* | 10/2014 | O'Donnell .......... G06F 9/45533 718/1 |
| 2015/0055456 | A1* | 2/2015 | Agarwal ............. H04L 49/9047 370/230 |
| 2016/0134881 | A1* | 5/2016 | Wang ................... H04N 19/436 375/240.02 |
| 2017/0075719 | A1* | 3/2017 | Scallan ............... H04L 41/5051 |
| 2017/0235507 | A1* | 8/2017 | Sinha .................... G06F 3/0665 711/114 |
| 2018/0181383 | A1* | 6/2018 | Jagannath ................. G06F 9/50 |

* cited by examiner

*Primary Examiner* — Tuan C Dao
(74) *Attorney, Agent, or Firm* — Fish & Richardson P.C.

(57) ABSTRACT

A first message from a first state transition queue is obtained by a first task executor of a virtual machine (VM) pooling service node. The operation to be performed on the VM is triggered. Whether the operation to be performed on the VM is successfully performed is determined. If it is determined that the operation to be performed on the VM is successfully performed, a second message is placed into a second state transition queue, and the second message represents the VM that is in a transitional state, the second message is obtained by a second task executor of the VM pooling service node, and whether the VM reaches a target state is determined by performing a check on the VM. Otherwise, the first message is returned to the first state transitional queue.

17 Claims, 4 Drawing Sheets

DISTRIBUTED PERSISTENT VIRTUAL MACHINE POOLING SERVICE

BACKGROUND

In a cloud platform, each instance of a cloud-based software application is typically configured to execute on a separate virtual machine. That is, upon a request to start an application instance, one or more virtual machines need to be made available to the cloud platform to select from in order to execute the application. The number of virtual machines to make available can depend upon the application configuration. Usually, more than one virtual machine is needed to ensure availability and scalability for a given application. The virtual machines can be supplied by an underlying infrastructure as a service (IaaS) layer upon a request received from the cloud platform.

SUMMARY

The present disclosure describes methods and systems, including computer-implemented methods, computer program products, and computer systems for a distributed virtual machine (VM) pooling service.

In an implementation, a first message from a first state transition queue is obtained by a first task executor of a virtual machine (VM) pooling service node. The first message is associated with a VM, and the first state transition queue is associated with an operation to be performed on the VM. The operation to be performed on the VM is triggered. It is determined whether the operation to be performed on the VM is successfully performed. If it is determined that the operation to be performed on the VM is successfully performed, a second message is placed into a second state transition queue, and the second message represents the VM that is in a transitional state, the second message is obtained by a second task executor of the VM pooling service node, and whether the VM reaches a target state is determined by performing a check on the VM. If it is determined that the operation to be performed on the VM is not successfully performed, the first message is returned to the first state transitional queue.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a described VMs in a VM pool are ready to be used immediately, reducing delay. Second, because of consistent and reliable maintenance of VMs that are pooled together, access to the VM pool is consistent and reliable. Third, the described approach allows for fine-grained control over requests made to a service provider to create new VMs to fill the VM pool. Fourth, the described approach also removes any persistence from a VM pool implementation, and moves the persistence under a "persistent" messaging queue. This configuration simplifies development and subsequent installation and operation of the solution. Additionally, described cluster logic can be outsourced from the VM pool to the messaging queue, eliminating a need for cluster management code in the VM pool implementation and simplifying development, installation and operation of the VM pooling service.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
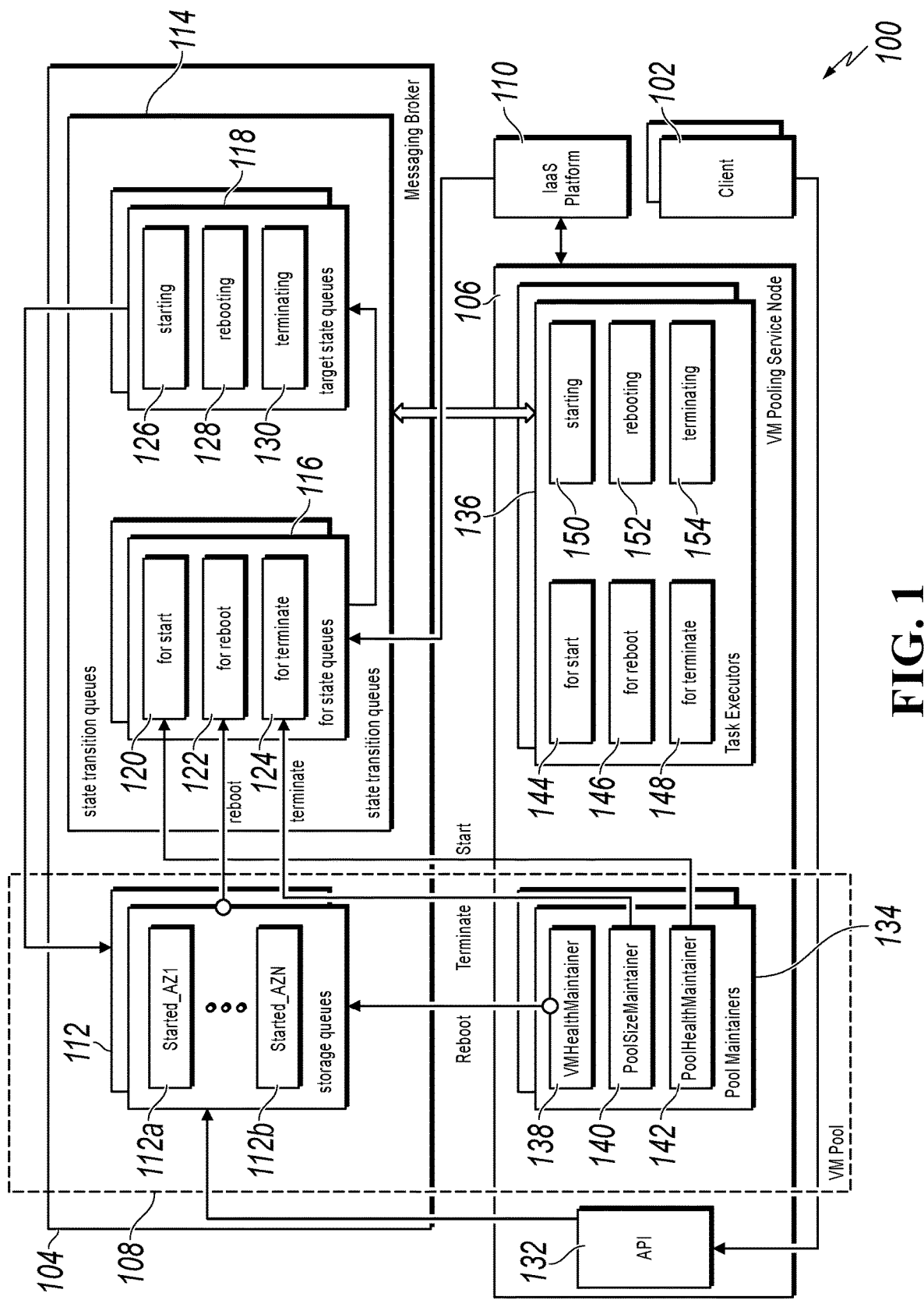
FIG. 1 is an example diagram illustrating the system environment of a VM pooling service, according to some implementations of the present disclosure.

The following detailed description describes a distributed persistent virtual machine (VM) pooling service and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Cloud-computing platforms, such as the SAP CLOUD PLATFORM NEO, is a suite of cloud computing services that runs on a cloud-computing based infrastructure. The provided services enable consumers to deploy consumer-created or acquired software applications (or "applications") onto the infrastructure. Such applications can be created using programming languages, libraries, services, and tools supported by the provider. In a cloud platform, each application instance runs on a separate VM, and a configured number of VMs need to be made available when an application starts running. The number of configured VMs depends on the application configuration. An underlying IaaS platform (for example, SAP's proprietary Global Management Platform (GMP) used by the SAP CLOUD PLATFORM NEO) is responsible for supplying the VMs when a request from the cloud platform is received at an infrastructure as a service (IaaS) layer, which can be considered to be a cloud-computing service. An IaaS provider can host infrastructure components (such as, servers, storage, network hardware, and a virtualization layer) and supply a range of services. An IaaS customer, by using the IaaS provider's services, can install remaining elements of an application stack (for example, by logging into the IaaS platform to create VMs). Because the IaaS platform provides a supporting role in cloud platform services, if the IaaS platform fails, no new applications can be started and existing applications may operate in an increasingly inefficient manner in a cloud-computing environment (for example, if increased capacity is needed due to higher-than-normal customer traffic, proper scaling cannot occur). Therefore, preventing or mitigating IaaS platform failures is important in cloud platform development efforts.

Currently, pooling existing VMs is a possible solution to solve the described problem. Using this solution, if the IaaS platform fails, starting or maintaining applications can be accomplished by retrieving an already prepared VM from a VM pool. Retrieving an existing VM from the pool requires a much shorter time comparing with starting with a new VM. A lifecycle management service (such as, the ORCHESTRATOR in SAP CLOUD PLATFORM NEO and the CLOUD CONTROLLER in the SAP CLOUD FOUNDRY) within the cloud-computing platform is responsible for regulating application lifecycles (such as, the start, stop, and update of applications), and all nodes (that is, VMs) on which instances (usually more than one, can be three or four) of the lifecycle management service run. A cloud-computing platform can execute more than one of the lifecycle management services, each having access to the pooled VMs.

Some implementations of pooling functionality exist. For example, HAZELCAST (by Hazelcast, Palo Alto, Calif. USA) is an open source in-memory data grid based on the JAVA language that emulates memory shared between orchestrator nodes. However, the HAZELCAST approach has some drawbacks, such as requiring additional functionality to be used or to be implemented by the orchestrator service. As an example under this approach, additional functionality to exclusively lock a pool must be added to the orchestrator service. Using the exclusive locking functionality, when one orchestrator node manages the pool (such as, reading or writing from or to the shared memory, respectively), the orchestrator node can lock the pool so that no other orchestrator node is permitted to change the shared memory. This approach also requires implementation of a backing persistence for fast service recovery (such as, failure of all orchestrator nodes) to prevent loss of the shared memory. Moreover, because the implemented in-memory data grid favors availability over consistency (by design), in certain situations, incorrect states (such as, one orchestrator node perceiving a different state of the shared memory than other orchestrator nodes) can result).

Another possible approach is to add a relational database to pooling logic. However, adding the relational database as an additional service requires additional configuration for the database to notify the orchestrator nodes each time a new VM has been produced. In some implementations, the notifications can be made by using database triggers. While database triggers are a standardized approach with respect to databases, implementation can be difficult and inefficient.

This disclosure describes a distributed VM pooling service implementation based on a messaging service (or messaging middleware). The described VM pooling issues present a problem similar to that of a "producer and consumer". That is, in operation, the IaaS platform (or other service) acts as a producer and monitors a VM pool configuration. Upon certain events, such as an amount of VMs falling below a specified minimum number, the producer can create new VMs from the IaaS platform and place them into the VM pool. On the other hand, a cloud controller (such as a remote procedure call (RPC) cloud controller) can act as a consumer (that is, the cloud controller receives VMs from the VM pool when an application starts, needs to scale, or as a result of other conditions consistent this disclosure.

Messaging middleware can be leveraged to help solve the "producer and consumer" problem by providing a general means for delivering a message to only one set of recipients through use of a message queue. That is, in the described solution, different message queues are set up in the cloud-computing service platform. Task executors executing on one or more VM pooling service nodes can invoke the IaaS platform to create new VMs. Detailed information with respect to each VM (such as, Internet Protocol (IP) address, host, and availability zones) are encapsulated within a single message and put into a message queue. At the same time, the VM pooling service nodes can also be configured to act as consumers of the same message queue. Upon a lifecycle-type operation (that is, a state transition) occurring on a VM, the VM pooling service nodes read the message and use contents of the message to perform specific lifecycle operations on the VM.

The described approach offers advantages over existing solutions. For example, compared with the previously described solutions (such as, HAZELCAST or database), the described approach provides a more consistent service using the messaging middleware. Further, relying on the "deliver once" paradigm of the messaging middleware, the described approach is no longer required to implement additional locking in order to ensure consistency between nodes (as HAZELCAST does), making the codebase simpler and easier to maintain.

FIG. 1 is an example diagram illustrating the system environment 100 of a VM pooling service, according to some implementations of the present disclosure. In some implementations, VMs are stored in a distributed manner in a VM pool. The VM pooling service includes one or more clients 102, a messaging broker 104, one or more VM pooling service nodes 106, a VM pool 108, and an IaaS platform 110.

In some implementations, the messaging broker 104 contains two types of message queues: 1) the storage queues 112 and 2) the state transition queues 114. The storage queues 112 (including 112a and 112b, collectively as 112 hereinafter) store a number of messages and each message represents a VM that is ready to be used for a client 102. VMs inside the storage queues 112 belong to different availability zones and can be grouped together based on particular availability zones. Each availability zone corresponds to a message queue. For example, as shown in FIG. 1, the storage queues 112 contain a number of message queues, such as "started_AZ1" queue 112a and "started_AZN" queue 112b. VMs in one or more storage queues 112 form a pool of VMs.

The state transition queue 114 includes a number of state queues 116 and a number of target state queues 118. In an operating system (OS), new OS patches are released periodically so that the OS can meet necessary/required security standards. Most of newly released OS patches can be applied online without affecting operation of a virtual machine. However, certain OS patches cannot be applied online or may require reboot of a VM. As such, VMs may need to be have to be taken offline and rebooted to apply the offline patches.

In another example, in order to accumulate released OS patches, a new OS image is periodically released. In these cases existing VMs do not receive the new OS image, new OS images are used for newly created virtual machines. In order to ensure that VMs are running an OS image that is as new as possible, each VM is configured with maximum age. VMs that are older than the configured maximum age are terminated and regenerated with the newer OS image/configurations. Therefore, in some implementations, VMs go through one of the three states: 1) start, 2) reboot, and 3) terminate. As a result, queues associated with the state transition queue 114 correspond to one of the three states.

Specifically, the "for state" message queues 116 include three types of message queues, 1) the "for start" queue 120, 2) the "for reboot" queue 122, and 3) the "for terminate" queue 124. Is some implementations, each of the "for state" message queues is a single queue, that is, there is no queue of this type in the VM pool 108. In some implementations, each message in the "for start" queue 120 represents a request for the creation of a new VM. In some implementations, each message in the "for reboot" queue 122 represents a VM that needs to be rebooted. In some implementations, each message in the "for terminate" queue 124 represents a VM that needs, and is scheduled, to be terminated.

The target state queues 118 also include three types of queues: 1) the starting queue 126, 2) the rebooting queue 128, and 3) the terminating queue 130. Each message contained in the target state queue 118 represents a VM that is in a transition state (that is, starting (or so-called creating), rebooting, or terminating). The operations that put each VM in such states are performed by the IaaS platform. A VM is realistically not usable while an operation (such as, create, reboot, or terminate) is being performed on the VM, so the VM is kept in the state transition queue. In some implementations, timeouts can be configured that define a maximum amount of the time that a VM can remain in each one of the transitioning states (create and reboot). Where the transition state is terminate, a VM remains in the terminating queue until it is properly terminated. If there is a failure of termination functionality, the continued presence of the VM in the terminating queue can be indicative of an abnormal condition. In such implementations, a termination queue monitor can be used to send an alert(s) when VMs are queued up in the terminating queue to the point that some action needs to be taken. Once the creation of a VM is triggered, VMs in the starting queue 126 are placed into a "pending" state to be created by the IaaS platform 110. If the VM is successfully created, it is put into the storage queues 112. Likewise, once a VM in the rebooting queue 128 is successfully rebooted, it is also put into to the storage queues 112. For VMs in the terminating queue 130, once the termination of the VM is triggered, the VMs are placed into a "stopping" (or similar) state. Unlike the previous cases, VMs in this queue are not put into the storage queues 112 if they are successfully terminated. If a VM is not properly terminated, the VM will remain in the terminating queue. In some implementations, information about successfully terminated VMs can stored in log files (for example, for use in metrics, diagnostics, and other types of analysis).

In some implementations, each VM pooling service node 106 includes components such as an API 132, a number of pool maintainers 134, and a number of task executors 136. The storage queue 112 and the maintainers 134 form the VM pool 108. Note that task executors 136 are used singly (meaning that a single task executor 136 is used for each VM pool. When a client (such as a user) 102 needs a VM, the client 102 calls the API 132 of the VM pooling service Node 106 to retrieve the VM from the VM pool 108. When the client 102 finishes using the VM, the client 102 can return the VM back to the VM pool 108 by again calling the API 132.

VM pool maintainers 134 include three types of maintainers: 1) the VMHealthMaintainer 138, 2) the PoolSizeMaintainer 140, and 3) the PoolHealthMaintainer 142. Each VM pool maintainer periodically (for example, using a pre-determined or dynamically-determined timeframe) monitors and communicates with the storage queues 112 by receiving messages containing information related to the VMs stored in the message queues. Based on the received message, if it is determined that there is no action needs to be taken, the VM pool maintainers 134 returns the message to the storage queues 112. Otherwise, the VM pool maintainers 134 send messages to the state transition queues 114 so that specific operations can be performed on the VMs, as described more fully in the following paragraphs.

The VMHealthMaintainer 138 inspects the age and need "for reboot" of each VM belonging to the VM pool 108. As previously described, even if successfully created and marked as ready to be used, the state of a VM may change over time. As previously mentioned, a VM is scheduled to be terminated if the VM is older than a configured maximum age. In some implementations, the VMHealthMaintainer 138 removes the "older" VM from the VM pool 108 and places the VM into the "for terminate" queue 124. Likewise, if a VM is scheduled to be rebooted, the VMHealthMaintainer 138 can remove the VM from the VM pool 108 and place the VM into the "for reboot" queue 124.

Besides providing VMs to the client 102, the VM pool 108 also needs to satisfy other requirements. For example, in order to be able to satisfy demands for VMs, each VM pool 108 needs to maintain a minimum available number of VMs. Meanwhile, in order to not exceed available hardware resource capability, the number of VMs kept in the VM pool 108 should be limited to a maximum size consistent with the available hardware resource capability. The PoolSizeMaintainer 140 is responsible for making sure that the number of VMs in the VM pool 108 is between the configured minimum and maximum size. In some implementations, for example, if the number of VMs in the VM pool 108 is below the minimum size, a new VM is scheduled to be created by the PoolSizeMaintainer 140 sending a message to the "for start" queue 120. In some implementations, if the number of VMs in the VM pool 108 is above a maximum size, the PoolSizeMaintainer 140 can send a message to the "for terminate" queue 124 and schedule a VM inside the VM pool 108 for termination.

The PoolHealthMaintainer 142 periodically (for example, using a pre-determined or dynamically-determined timeframe) schedules creation of new VMs. That is, the PoolHealthMaintainer 142 can be configured to periodically (for example, using a pre-determined or dynamically-determined timeframe) send a message to the "for start" queue 120. The PoolHealthMaintainer 142 is not required to execute for each VM pool 108, and operation of the PoolHealthMaintainer 142 depends on a configuration(s) of the VM pool 108.

The task executors 136 are components that assist a VM transition to different states. In some implementations, the task executors 136 execute the tasks (messages) that are placed in each of the state transition queues 114. Each task executor 136 corresponds to a separate state transition queue 114. Specifically, in some implementations, the task executors 136 include six types of executors: 1) the "for start" executor 144, 2) the "for reboot" executor 146, 3) the "for terminate" executor 148, 4) the starting executor 150, 5) the rebooting executor 152, and 6) the terminating executor 154. Communications between the task executors 136 and the storage queues 112 and state transition queues 114 will be described in more details with respect to FIG. 2.

The IaaS 108 is the underlying infrastructure provider. Task executors 136 running inside the VM polling service nodes 106 communicates with the IaaS platform 110 to maintain the VM pools 108.

Figure 2:
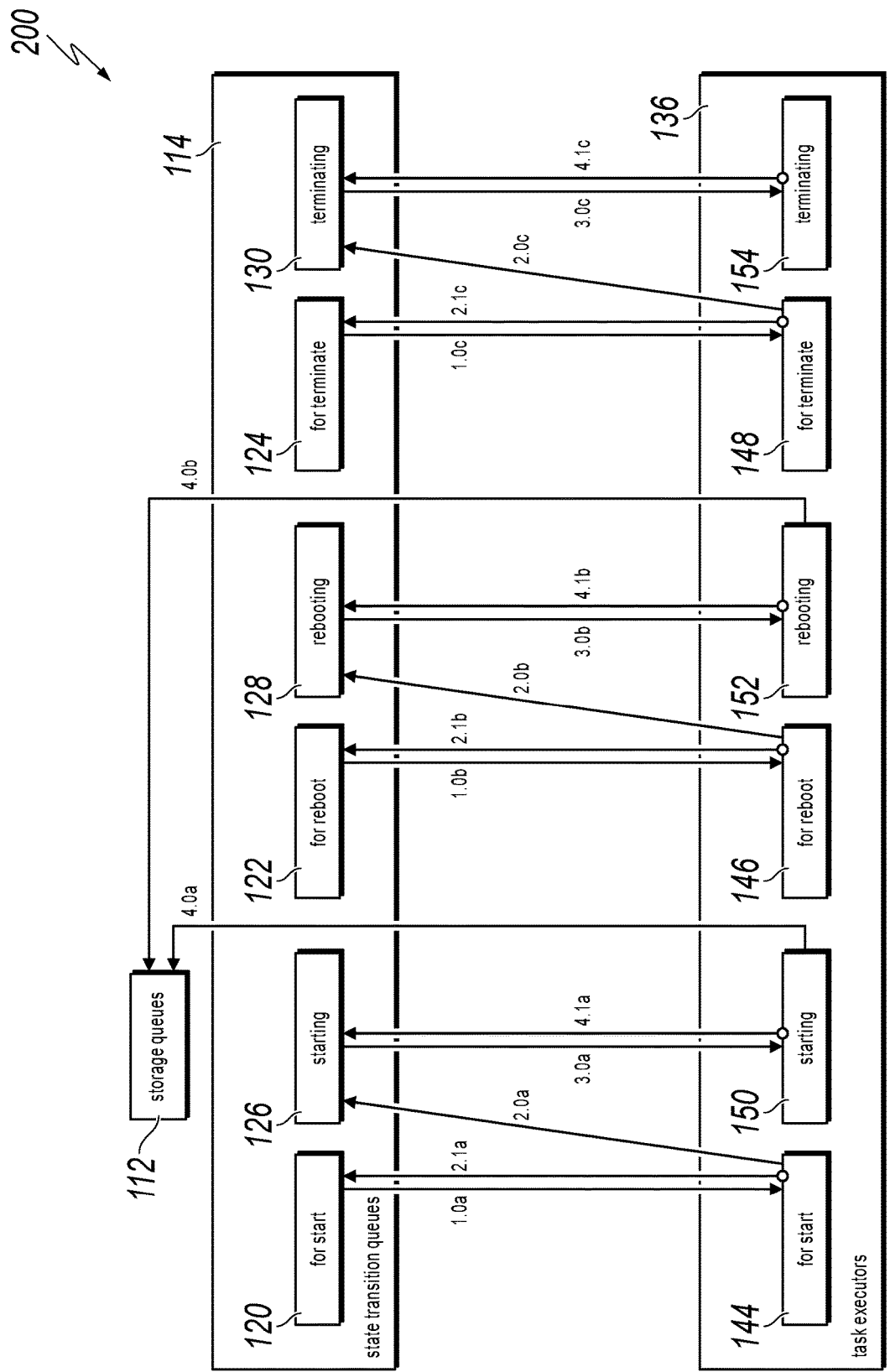
FIG. 2 is a block diagram illustrating an example system for performing operations on one or more virtual machines of the virtual machine pooling service, according to an implementation of the present disclosure.

FIG. 2 is a block diagram illustrating an example system 200 for performing operations on one or more VMs of the VM pooling service, according to an implementation of the present disclosure. For ease of description, like reference numbers and designations in FIGS. 1-2 indicate like elements, and communication between two components is labeled by a numerical number next to the connection line.

The "for start" executor 144 takes a message from the "for start" queue 120 and triggers the creation of a new VM of a specific type (for example, availability, zone, or size) (1.0a). When the triggering completes successfully, the "for start" executor 144 sends a new message to the starting queue 126 (2.0a). If the creation of the new virtual machine fails, the message is placed back into the "for star" queue 120 (2.1a). After the operation of creating the VM is triggered, the starting executor 150 takes the new message (that is, a VM that is undergoing the "starting" state) from the starting queue 126, based on the content of the message. The starting executor 150 also checks if the VM actually starts (3.0a). If the VM has successfully started, the VM is placed into a proper storage queue 112 (4.0a). If not, the new message is returned back to the starting queue 126 (4.1a).

The "for reboot" executor 122 takes a message from the "for reboot" queue 122 and triggers the reboot of the VM that is contained in the message (1.0b). When the triggering completes successfully, the "for reboot" executor 122 sends a new message to the rebooting queue 152 (that is, the VM is transferred to the rebooting queue) (2.0b). If there is a problem with performing the reboot of the virtual machine, the message is put back into the "for reboot" queue 122 (2.1b). After the rebooting operation is triggered, the rebooting executor 152 takes the new message (that is, a VM that is undergoing the "rebooting" state) from the starting queue 126, based on the content of the message. The rebooting executor 152 checks if the VM is successfully rebooted (3.0b). If so, the VM is sent to a storage queue 112 (4.0b). If not, the new message is returned back to the rebooting queue 128 (4.1b).

The "for terminate" executor 148 takes a message from the "for terminate" queue 124 and triggers the termination of the VM that contained in the message (1.0c). When the triggering successfully completes, the "for terminate" executor 148 sends a new message to the terminating queue 130 (that is, the VM is transferred to the terminating queue) (2.0c). If the triggering fails, the message is put back into the "terminate" queue (2.1c). After triggering of the terminate operation, the terminating executor 152 takes the new message from the terminating queue 130, based on the content of the message. The terminating executor 152 checks if the VM is successfully terminated (3.0c). If so, no message is sent to any other queue. If not, the new message is returned back to the terminating queue 130 (4.1c).

Figure 3:
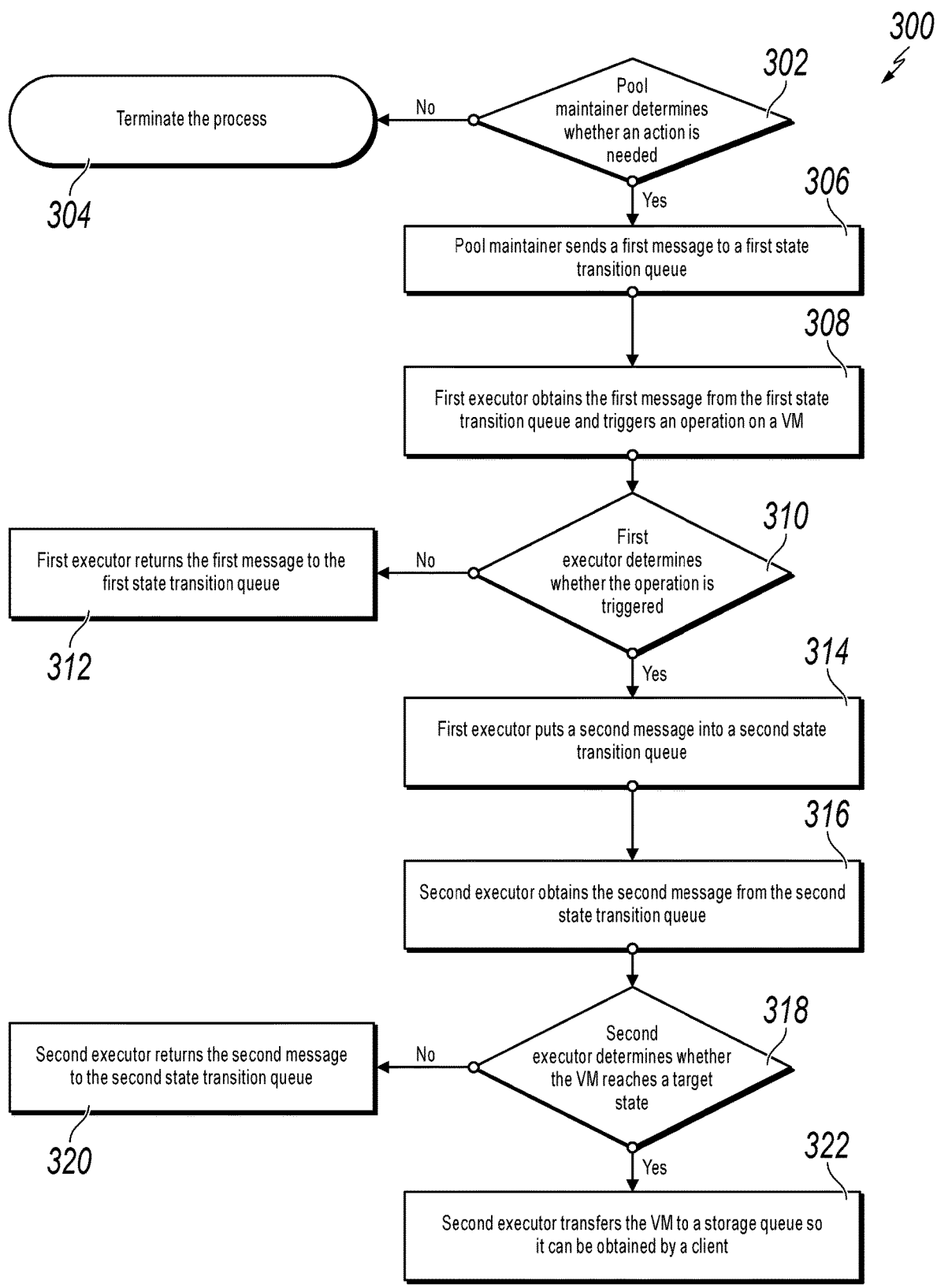
FIG. 3 is a flowchart illustrating an example of a computer-implemented method for performing operations on virtual machines of the virtual machine pooling service and providing the virtual machines to a client, according to an implementation of the present disclosure.

FIG. 3 is a flowchart illustrating an example of a computer-implemented method 300 for performing operations on virtual machines of the virtual machine pooling service and providing the virtual machines to a client, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, a pool maintainer determines whether an action is needed to be performed for a VM pooling service. In some implementations, the VM pooling service includes more than one VM pool service node, a number of storage queues that store VMs ready to be used, a number of state transition queues, a number of task executors and pool maintainers. In some implementations, each state transition queue can be a first state transition queue or a second state transition queue. In some implementations, the action can be creating a new VM, rebooting an existing VM in the storage queues, or terminating an existing VM in the storage queues.

In some implementations, the pool maintainers determine whether a termination action or a reboot action is needed by inspecting the age and needs "for reboot" of each VM in the storage queue. In some implementations, the pool maintainer can determine whether a creation action or a termination action is needed by determining whether the size of the VM pool (that is, a number of VMs in the storage queues) is less than a predetermined minimum number or greater than a predetermined maximum number, respectively. In some implementations, the pool maintainer determines that a creation action is needed periodically (for example, using a pre-determined or dynamically-determined timeframe).

If the pool maintainer determines a new action is not needed, the method 300 proceeds to 304, and the process can be terminated. After 304, method 300 can stop. Otherwise, after 302, method 300 proceeds to 306.

At 306, the pool maintainer sends a first message to a first state transition queue. In some implementations, the first state transition queue is associated with an operation to be performed on a VM. In such implementations, the first state transition queue can be a first start queue associated with an operation to create a new VM, a "for reboot" queue associated with an operation to reboot a VM, and a "for terminate" queue associated with an operation to terminate a VM.

In some implementations, the first state transition queue contains a number of messages. If the to-be-performed operation is to create a new VM, the first message represents a request to create the new VM. In some implementations, the pool maintainer sends the first message by sending the request to create a new VM to the first state transition queue. If the to-be-performed operation is to reboot or to terminate an existing VM, the first message represents that the VM needs to be rebooted or to be terminated, respectively. In some implementations, the pool maintainer sends the first message by placing the first message (that is, the VM) into the first state transition queue. After 306, method 300 proceeds to 308.

At 308, a first task executor obtains the first message from the first state transition queue and triggers the to-be-performed operation of a VM. In some implementations, the first task executor can be a "for start" executor, a "for reboot" executor, or a "for terminate" executor, corresponding to the "for start" queue, the "for reboot" queue, and the "for terminate" queue, respectively. After 308, method 300 proceeds to 310.

At 310, the first task executor determines whether the to-be-performed operation is triggered. If it is determined the to-be-performed operation is not triggered, method 300 proceeds to 312. At 312, the first task executor returns the first message to the first state transition queue. After 312, method 300 can stop. If it is determined that the to-be-performed operation is triggered, method 300 proceeds to 314.

At 314, the first task executor puts a second message into a second state transition queue. In some implementations, the second message represents a VM on which an operation is successfully triggered. In some implementations, the second state transition queue can be a starting queue, a rebooting queue, or a terminating queue. In some implementations, the VM transitions states (such as, starting and running, rebooting, or terminating) in the second state transition queue. After 314, method 300 proceeds to 316.

At 316, a second task executor obtains the second message from the second state transition queue. In some implementations, the second task executor can be a starting executor, a rebooting executor, or a terminating executor. In such implementations, the second task executor also performs a check on the obtained second message. After 316, method 300 proceeds to 318.

At 318, the second task executor determines whether the VM represented by the second message reaches a target state. That is, determines whether a new VM is created, whether the existing VM is rebooted, or whether the existing VM is terminated. If it is determined the target state is not reached, method 300 proceeds to 320. At 320, the second task executor returns the second message to the second state transition queue. After 320, method 300 can stop. If it is determined the target state is reached, method 300 proceeds to 322.

At 322, the second executor transfers the created new VM or the rebooted VM to the storage queue as a VM that is ready to be used by a client. After 322, method 300 can stop.

Figure 4:
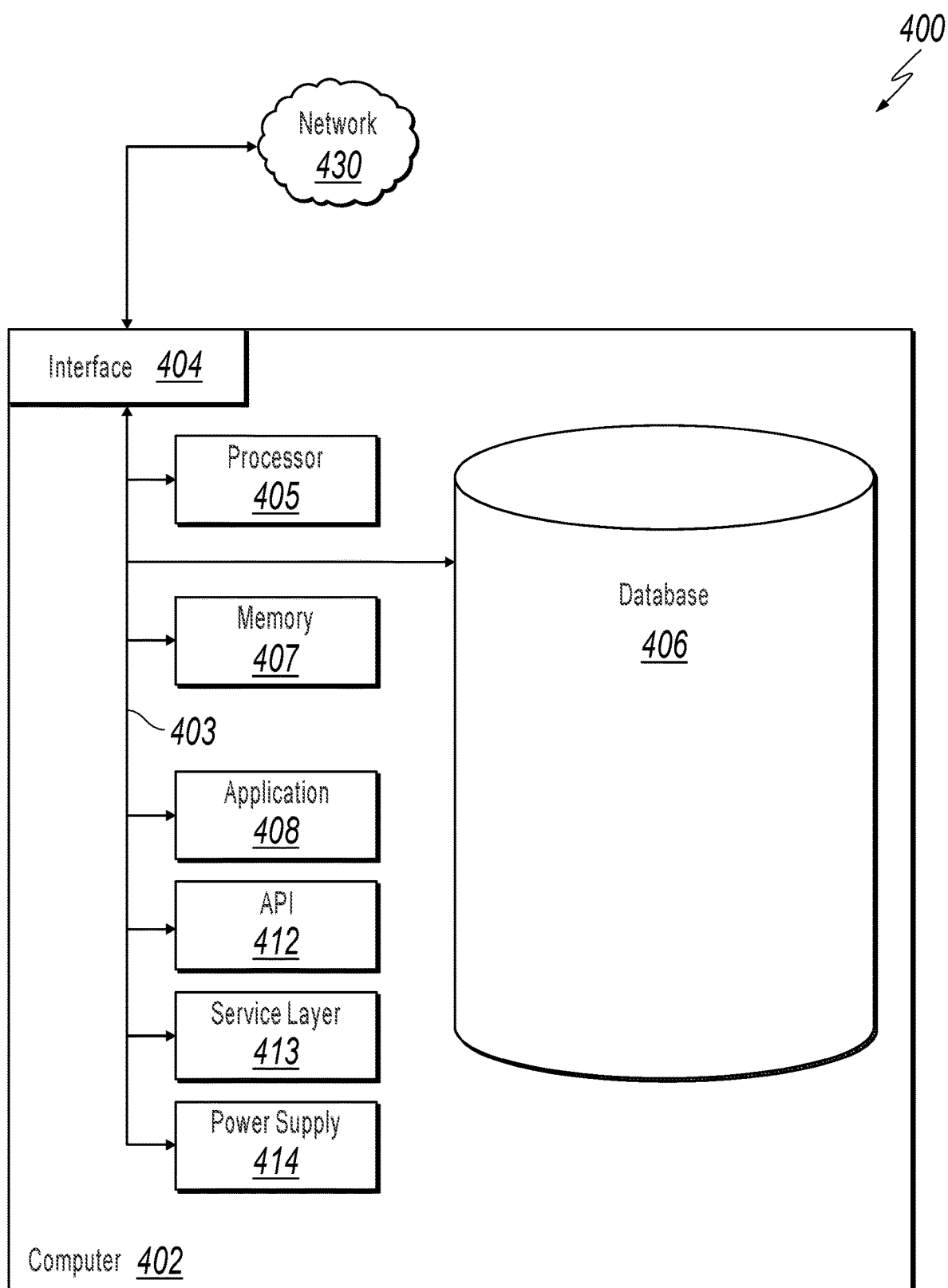
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the Database 406 holds the previously described data for entities such as intents data 416, expressions data 418, skills data 420, and channel connectors data 422.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, includes obtaining, by a first task executor of a virtual machine (VM) pooling service node, a first message from a first state transition queue, wherein the first message is associated with a VM, and wherein the first state transition queue is associated with an operation to be performed on the VM; triggering the operation to be performed on the VM; determining whether the operation to be performed on the VM is successfully performed; if it is determined that the operation to be performed on the VM is successfully performed: placing a second message into a second state transition queue, wherein the second message represents the VM that is in a transitional state; obtaining, by a second task executor of the VM pooling service node, the second message; and determining whether the VM reaches a target state by performing a check on the VM. Or if it is determined that the operation to be performed on the VM is not successfully performed: returning the first message to the first state transitional queue.

The foregoing and other described implementations can each, optionally, include one or more of the following features:

A first feature, combinable with any of the following features, wherein each of the first state transition queue and the second state transition queue contains a number of VMs.

A second feature, combinable with any of the previous or following features, wherein the target state is a start state or a reboot state, and further including if it is determined that the VM reaches the target state, transferring the VM to a storage queue, wherein the storage queue includes a number of VMs that are ready to be used; or if it is determined that the VM does not reach the target state, returning the second message to the second state transitional queue.

A third feature, combinable with any of the previous or following features, wherein the target state is a termination state, and further including if it is determined that the VM reaches the target state, logging information about the VM into a log; or if it is determined that the VM does not reach the target state, returning the second message to the second state transitional queue.

A fourth feature, combinable with any of the previous or following features, wherein the VM service pooling node communicates with an Infrastructure as a Service (IaaS) layer to maintain a VM pooling service, wherein the VM pooling service includes one or more VM service pooling nodes, a number of storage queues, state transitional queues, the first task executor and the second task executor, and pool maintainers, and wherein the VMs inside the storage queues form at least one VM pool.

A fifth feature, combinable with any of the previous or following features, further including obtaining, by a client, a VM from the VM pool by calling an API of the VM pooling service node when the client has need of the VM; and returning the VM to the VM pool by calling the API of the VM pooling service when the client finishes using the VM.

A sixth feature, combinable with any of the previous or following features, further including obtaining, by a pool maintainer of the pool maintainers, a message from a storage queue to determine whether an action is needed to be taken based on predetermined criteria, wherein the message represents a VM within the storage queue; if it is determined that the action is needed, sending the message to a state transitional queue corresponding to the action to schedule an operation to be performed on the VM; or if it is determined that the action is not needed, sending the message back to the storage queue.

In a second implementation, a non-transitory, computer-readable medium storing one or more instructions executable by a computer system to perform operations including obtaining, by a first task executor of a virtual machine (VM) pooling service node, a first message from a first state transition queue, wherein the first message is associated with a VM, and wherein the first state transition queue is associated with an operation to be performed on the VM; triggering the operation to be performed on the VM; determining whether the operation to be performed on the VM is successfully performed; if it is determined that the operation to be performed on the VM is successfully performed: placing a second message into a second state transition queue, wherein the second message represents the VM that is in a transitional state; obtaining, by a second task executor of the VM pooling service node, the second message; and determining whether the VM reaches a target state by performing a check on the VM. Or if it is determined that the operation to be performed on the VM is not successfully performed: returning the first message to the first state transitional queue.

The foregoing and other described implementations can each, optionally, include one or more of the following features:

A first feature, combinable with any of the following features, wherein each of the first state transition queue and the second state transition queue contains a number of VMs.

A second feature, combinable with any of the previous or following features, wherein the target state is a start state or a reboot state, and further including if it is determined that the VM reaches the target state, transferring the VM to a storage queue, wherein the storage queue includes a number of VMs that are ready to be used; or if it is determined that the VM does not reach the target state, returning the second message to the second state transitional queue.

A third feature, combinable with any of the previous or following features, wherein the target state is a termination state, and further including if it is determined that the VM reaches the target state, logging information about the VM into a log; or if it is determined that the VM does not reach the target state, returning the second message to the second state transitional queue.

A fourth feature, combinable with any of the previous or following features, wherein the VM service pooling node communicates with an Infrastructure as a Service (IaaS) layer to maintain a VM pooling service, wherein the VM pooling service includes one or more VM service pooling nodes, a number of storage queues, state transitional queues, the first task executor and the second task executor, and pool maintainers, and wherein the VMs inside the storage queues form at least one VM pool.

A fifth feature, combinable with any of the previous or following features, further including obtaining, by a client, a VM from the VM pool by calling an API of the VM pooling service node when the client has need of the VM; and returning the VM to the VM pool by calling the API of the VM pooling service when the client finishes using the VM.

A sixth feature, combinable with any of the previous or following features, further including obtaining, by a pool maintainer of the pool maintainers, a message from a storage queue to determine whether an action is needed to be taken based on predetermined criteria, wherein the message represents a VM within the storage queue; if it is determined that the action is needed, sending the message to a state transitional queue corresponding to the action to schedule an operation to be performed on the VM; or if it is determined that the action is not needed, sending the message back to the storage queue.

In a third implementation, a computer-implemented system, comprising, one or more computers; and one or more computer memory devices interoperably coupled with the one or more computers and having tangible, non-transitory, machine-readable media storing one or more instructions that, when executed by the one or more computers, perform one or more operations including obtaining, by a first task executor of a virtual machine (VM) pooling service node, a first message from a first state transition queue, wherein the first message is associated with a VM, and wherein the first state transition queue is associated with an operation to be performed on the VM; triggering the operation to be performed on the VM; determining whether the operation to be performed on the VM is successfully performed; if it is determined that the operation to be performed on the VM is successfully performed: placing a second message into a second state transition queue, wherein the second message represents the VM that is in a transitional state; obtaining, by a second task executor of the VM pooling service node, the second message; and determining whether the VM reaches a target state by performing a check on the VM. Or if it is determined that the operation to be performed on the VM is not successfully performed: returning the first message to the first state transitional queue.

The foregoing and other described implementations can each, optionally, include one or more of the following features:

A first feature, combinable with any of the following features, wherein each of the first state transition queue and the second state transition queue contains a number of VMs.

A second feature, combinable with any of the previous or following features, wherein the target state is a start state or a reboot state, and further including if it is determined that the VM reaches the target state, transferring the VM to a storage queue, wherein the storage queue includes a number of VMs that are ready to be used; or if it is determined that the VM does not reach the target state, returning the second message to the second state transitional queue.

A third feature, combinable with any of the previous or following features, wherein the target state is a termination state, and further including if it is determined that the VM reaches the target state, logging information about the VM into a log; or if it is determined that the VM does not reach the target state, returning the second message to the second state transitional queue.

A fourth feature, combinable with any of the previous or following features, wherein the VM service pooling node communicates with an Infrastructure as a Service (IaaS) layer to maintain a VM pooling service, wherein the VM pooling service includes one or more VM service pooling nodes, a number of storage queues, state transitional queues, the first task executor and the second task executor, and pool maintainers, and wherein the VMs inside the storage queues form at least one VM pool.

A fifth feature, combinable with any of the previous or following features, further including obtaining, by a client, a VM from the VM pool by calling an API of the VM pooling service node when the client has need of the VM; and returning the VM to the VM pool by calling the API of the VM pooling service when the client finishes using the VM.

A sixth feature, combinable with any of the previous or following features, further including obtaining, by a pool maintainer of the pool maintainers, a message from a storage queue to determine whether an action is needed to be taken based on predetermined criteria, wherein the message represents a VM within the storage queue; if it is determined that the action is needed, sending the message to a state transitional queue corresponding to the action to schedule an operation to be performed on the VM; or if it is determined that the action is not needed, sending the message back to the storage queue.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    obtaining, by a first task executor of a virtual machine (VM) pooling service node, a first message from a first state transition queue, wherein the first message is associated with a VM, and wherein the first state transition queue is associated with an operation to be performed on the VM and returned operations with unsuccessful performance on the VM;
    triggering the operation to be performed on the VM;
    determining that the operation to be performed on the VM is successfully performed;
    in response to determining that the operation to be performed on the VM is successfully performed, placing a second message into a second state transition queue, wherein the second message represents the VM that is in a transitional state;
    obtaining, by a second task executor of the VM pooling service node, the second message;
    determining whether the VM reaches a target state by performing a check on the VM, wherein the target state is a start state or a reboot state; and
    in response to determining that the VM reaches the target state, transferring the VM to a storage queue, wherein the storage queue comprises a plurality of VMs that are ready to be used; or
    in response to determining that the VM does not reach the target state, returning the second message to a second state transitional queue.

2. The computer-implemented method of claim 1, wherein each of the first state transition queue and the second state transition queue contains a plurality of VMs.

3. The computer-implemented method of claim 1, wherein the target state is a first target state, and further comprising:
    determining whether the VM reaches a second target state by performing an additional check on the VM, wherein the target state is a termination state;
    in response to determining that the VM reaches the second target state, logging information about the VM into a log; or
    in response to determining that the VM does not reach the second target state, returning the second message to the second state transitional queue.

4. The computer-implemented method of claim 1, wherein the VM service pooling node communicates with an Infrastructure as a Service (IaaS) layer to maintain a VM pooling service, wherein the VM pooling service comprises one or more VM service pooling nodes, a plurality of storage queues, state transitional queues, the first task executor and the second task executor, and pool maintainers, and wherein the VMs inside the plurality of storage queues form at least one VM pool.

5. The computer-implemented method of claim 4, further comprising:
    obtaining, by a client, a VM from the VM pool by calling an API of the VM pooling service node when the client has need of the VM; and
    returning the VM to the VM pool by calling the API of the VM pooling service when the client finishes using the VM.

6. The computer-implemented method of claim 4, further comprising:
    obtaining, by a pool maintainer of the pool maintainers, a message from a storage queue to determine whether an action is needed to be taken based on predetermined criteria, wherein the message represents a VM within the storage queue;
    in response to determining that the action is needed, sending the message to a state transitional queue corresponding to the action to schedule an operation to be performed on the VM; or
    in response to determining that the action is not needed, sending the message back to the storage queue.

7. A non-transitory, computer-readable medium storing one or more instructions executable by a computer system to perform operations comprising:
    obtaining, by a first task executor of a virtual machine (VM) pooling service node, a first message from a first state transition queue, wherein the first message is associated with a VM, and wherein the first state transition queue is associated with an operation to be performed on the VM and returned operations with unsuccessful performance on the VM;
    triggering the operation to be performed on the VM;
    determining that the operation to be performed on the VM is successfully performed;
    in response to determining that the operation to be performed on the VM is successfully performed, placing a second message into a second state transition queue, wherein the second message represents the VM that is in a transitional state;

obtaining, by a second task executor of the VM pooling service node, the second message;
determining whether the VM reaches a target state by performing a check on the VM, wherein the target state is a start state or a reboot state; and
in response to determining that the VM reaches the target state, transferring the VM to a storage queue, wherein the storage queue comprises a plurality of VMs that are ready to be used; or
in response to determining that the VM does not reach the target state, returning the second message to a second state transitional queue.

8. The non-transitory, computer-readable medium of claim 7, wherein each of the first state transition queue and the second state transition queue contains a plurality of VMs.

9. The non-transitory, computer-readable medium of claim 7, wherein the target state is first target state, and further comprising:
determining whether the VM reaches a second target state by performing an additional check on the VM, wherein the target state is a termination state;
in response to determining that the VM reaches the second target state, logging information about the VM into a log; or
in response to determining that the VM does not reach the second target state, returning the second message to the second state transitional queue.

10. The non-transitory, computer-readable medium of claim 7, wherein the VM service pooling node communicates with an Infrastructure as a Service (IaaS) layer to maintain a VM pooling service, wherein the VM pooling service comprises one or more VM service pooling nodes, a plurality of storage queues, state transitional queues, the first task executor and the second task executor, and pool maintainers, and wherein the VMs inside the plurality of storage queues form at least one VM pool.

11. The non-transitory, computer-readable medium of claim 10, further comprising:
obtaining, by a client, a VM from the VM pool by calling an API of the VM pooling service node when the client has need of the VM; and
returning the VM to the VM pool by calling the API of the VM pooling service when the client finishes using the VM.

12. The non-transitory, computer-readable medium of claim 10, further comprising:
obtaining, by a pool maintainer of the pool maintainers, a message from a storage queue to determine whether an action is needed to be taken based on predetermined criteria, wherein the message represents a VM within the storage queue;
in response to determining that the action is needed, sending the message to a state transitional queue corresponding to the action to schedule an operation to be performed on the VM; or
in response to determining that the action is not needed, sending the message back to the storage queue.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
obtaining, by a first task executor of a virtual machine (VM) pooling service node, a first message from a first state transition queue, wherein the first message is associated with a VM, and wherein the first state transition queue is associated with an operation to be performed on the VM and returned operations with unsuccessful performance on the VM,
triggering the operation to be performed on the VM,
determining that the operation to be performed on the VM is successfully performed,
in response to determining that the operation to be performed on the VM is successfully performed, placing a second message into a second state transition queue, wherein the second message represents the VM that is in a transitional state;
obtaining, by a second task executor of the VM pooling service node, the second message,
determining whether the VM reaches a target state by performing a check on the VM, wherein the target state is a start state or a reboot state, and
in response to determining that the VM reaches the target state, transferring the VM to a storage queue, wherein the storage queue comprises a plurality of VMs that are ready to be used, or
in response to determining that the VM does not reach the target state, returning the second message to a second state transitional queue.

14. The computer-implemented system of claim 13, wherein each of the first state transition queue and the second state transition queue contains a plurality of VMs.

15. The computer-implemented system of claim 13, wherein the target state is a first target state, and further comprising:
determining whether the VM reaches a second target state by performing an additional check on the VM, wherein the target state is a termination state;
in response to determining that the VM reaches the second target state, logging information about the VM into a log; or
in response to determining that the VM does not reach the second target state, returning the second message to the second state transitional queue.

16. The computer-implemented system of claim 13, wherein the VM service pooling node communicates with an Infrastructure as a Service (IaaS) layer to maintain a VM pooling service, wherein the VM pooling service comprises one or more VM service pooling nodes, a plurality of storage queues, state transitional queues, the first task executor and the second task executor, and pool maintainers, and wherein the VMs inside the plurality of storage queues form at least one VM pool.

17. The computer-implemented system of claim 16, further comprising:
obtaining, by a client, a VM from the VM pool by calling an API of the VM pooling service node when the client has need of the VM; and
returning the VM to the VM pool by calling the API of the VM pooling service when the client finishes using the VM.

* * * * *